they form a part constitutes an efficient split lock nut or union for the purpose intended, and this device may be subjected to comparatively severe usage without liability of loosening and becoming displaced from a position of adjustment.

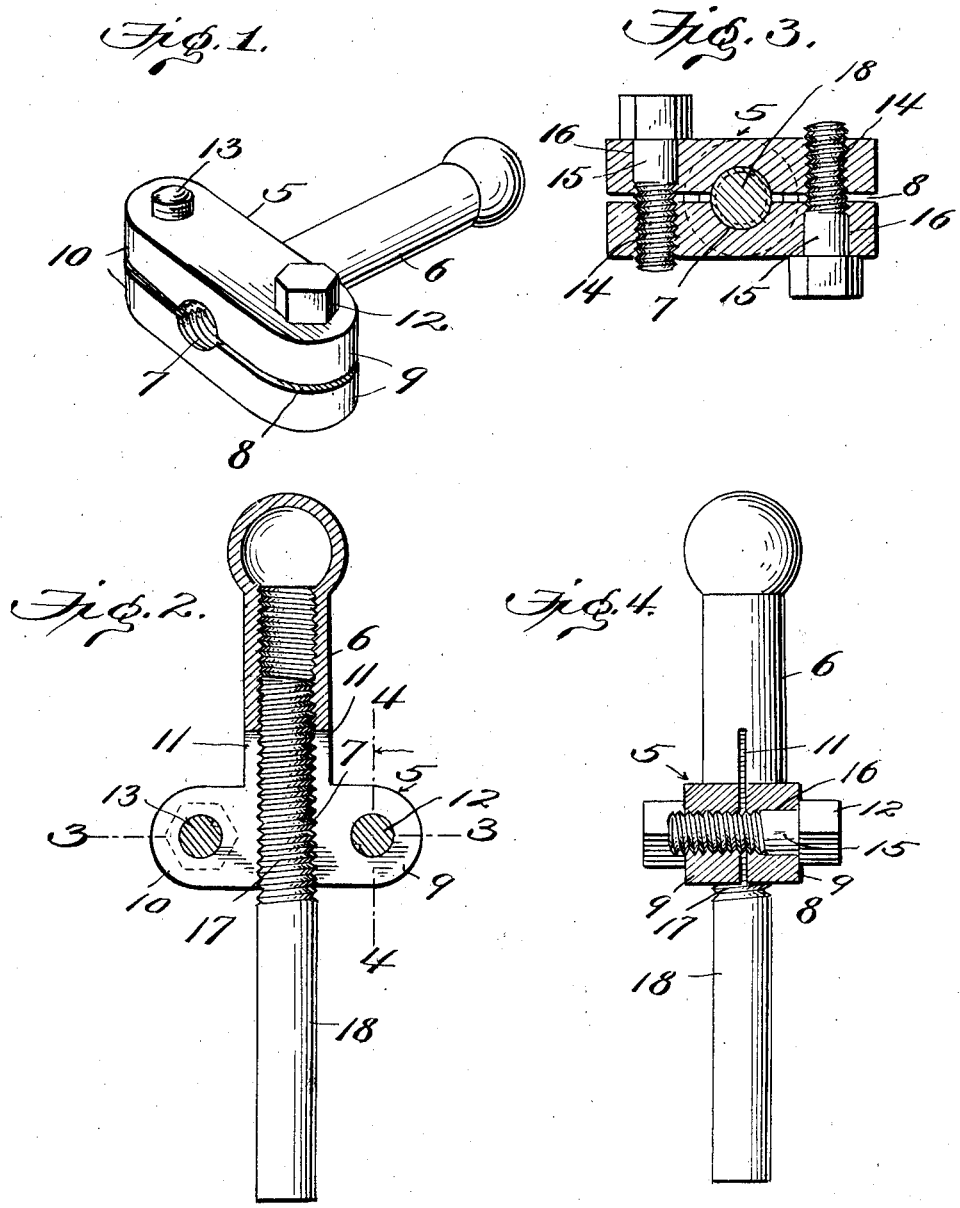

UNITED STATES PATENT OFFICE.

HARRY E. DICKINSON, OF SAN ANTONIO, TEXAS.

ADJUSTABLE SPLIT LOCK-NUT OR UNION.

1,350,142.     Specification of Letters Patent.     Patented Aug. 17, 1920.

Application filed September 11, 1919. Serial No. 323,073.

*To all whom it may concern:*

Be it known that I, HARRY E. DICKINSON, a citizen of the United States, residing at San Antonio, in the county of Bexar and State of Texas, have invented new and useful Improvements in Adjustable Split Lock-Nuts or Unions, of which the following is a specification.

This invention relates to adjustable unions or coupling devices in the form of split lock nuts or heads, and the primary object of the same is to provide a device of this character of a simple, cheap and efficient construction for particular use on valve rods of internal combustion engines, especially those used in automobiles and aeroplanes or on those motors or engines employing overhead valves and whereby the union or coupling may be readily and securely locked on a valve rod with sufficient resistance to withstand the strain of direct pressure, blows and torque action while in motion with materially less liability of loosening of the parts and consequent displacement thereof from a desired adjustable position which will cause the valves to have a comparatively longer positive operation. A further object of the invention is to provide a device of the class specified which is easily and quickly adjustable to take up wear on the terminals of the valve rod.

The improved adjustable union or split lock nut is formed of suitable hardened cast metal and comprises in the present instance a head which is formed as a part of a shaft and is adapted to carry a tappet or striking means, the head being projected equally on opposite sides of the rod to which it is attached and split longitudinally therethrough from one end to the other and partially into the shaft, to form opposite pairs of clamping jaws in which clamping screws are reversely mounted to reliably clamp the portion of the valve rod or other device to which it is applied.

The present adjustable union is an improvement on that disclosed by my pending application Serial No. 275,352, filed February 6, 1919, and consists in the construction and arrangement of the several parts which will be more fully hereinafter described and claimed.

In the drawing:—

Figure 1 is a perspective view of the improved adjustable union or split lock nut.

Fig. 2 is a longitudinal vertical section through the improved adjustable union.

Fig. 3 is a horizontal section taken in the plane of the line 3—3, Fig. 2.

Fig. 4 is a section taken in the plane of the line 4—4, Fig. 2.

The improved adjustable union comprises a head 5 and a shaft or shank 6, the head extending equally across the terminal of the shaft with which it is formed as an integral part. A threaded bore 7 extends through the head and into the shaft, the shaft intersecting one side of the head at the center of the latter. By this means the head and the shaft are essentially of T-form. The head is longitudinally split end to end and vertically therethrough as at 8, the continuation of the bore 7 of the head being also split to provide a pair of jaws 9 and 10 at each extremity of the head. The split 8 of the head is continued partially through the adjacent portion of the shaft 6 at diametrically opposite points in the latter, as at 11, so that the clamping action of the improved device will be effected in part in the shaft. The pairs of jaws 9 and 10 are engaged by clamping bolts 12 and 13 inserted through threaded openings 14 in the alternate jaws of each pair of jaws, a portion of the shanks of the bolts 12 and 13 being smooth as at 15, and the bores 16 of the jaws opposite the jaws having the threaded bores 14 also smooth for the purpose of rendering the clamping action of the bolts 12 and 13 more positive in view of the fact that the jaws having the screw-threaded bores 14 will be drawn toward the jaws with the smooth bores 16 when the bolts 12 and 13 are tightened. When these pairs of jaws 9 and 10 are drawn together or contracted the clamping pressure will be effected equally on opposite sides of the threaded bore 7 through the head and on the device that may be held thereby. The clamping tension, as for instance, on the screw-threaded extremity 17 of the rod 18, as shown, will be equal fully around the said screw-threaded extremity of the rod, and this clamping pressure will be continued through a portion of the length of the shaft 6 owing to the provision of the slots or continuation of the split 8 of the head in the shaft as at 11.

The slitted or slotted structure of the head and the extension of the latter equally on opposite sides of the shaft and also in relation to the part that may be secured therein permit a leverage whereby the clamping bolts may be caused to institute a powerful gripping or clutching action by their adjustment to equally draw the jaws and opposite portions of the head together, and such clamping action and grip may be readily produced with the intensity desired or found necessary through either pair of jaws by individual adjustment of the bolts to thereby insure a double securement and a tighter hold on the part clamped. The positive clutching or grasping action set up by the improved device will form a permanent union between the parts connected thereby and withstand the wear and tear of the action of direct pressure imposed on the head as well as blows and torque movements and thus hold the connected parts against loosening. When it is necessary to adjust the parts of the improved device to take up wear or to reset the rod or other member held by the head, such adjustment may be easily effected by a very simple manipulation.

It will be understood that the improved union or split lock nut may be generally applied and introduced at any point desired as a coupling means, but it has been particularly constructed for use with overhead valve mechanisms of motors or engines of the type hereinbefore specified.

What I claim is:—

1. An adjustable split lock nut or union of the character specified, comprising a tubular threaded shaft having a head at one end extending across the same equally from the center of the shaft and in a plane at right angles to the latter, the opposite end of the shaft being formed with a closed rigid impact receiving means, the threaded bore of the shaft being continued through the center of the head, the head being centrally split throughout its length to provide opposite pairs of end jaws, the split of the head being continued partway through the length of the shaft at diametrically opposite portions of the latter, and clamping bolts extending transversely through and reversely arranged in the pairs of jaws.

2. An adjustable split lock nut or union of the character specified, comprising a tubular threaded shaft having a straight head extending equally across one end of the same in a plane at right angles to the shaft, the opposite end of the shaft being formed with a closed rigid impact receiving means, the threaded bore of the shaft being continued from the rigid impact receiving means through the center of the head, the head being split centrally throughout its length to provide opposite pairs of end jaws, each of the pairs of jaws being provided in reverse relation with a smooth bore and a threaded bore extending transversely therethrough, and clamping bolts having threaded extremities and shanks which are partially smooth, the bolts being reversely inserted in the said threaded and smooth bores to exert drawing tension upon the pairs of jaws in reverse directions.

In testimony whereof I have hereunto set my hand in presence of two subscribing witnesses.

HARRY E. DICKINSON.

Witnesses:
MATILDA REHME,
A. L. SANDERFUR.